(12) United States Patent
Patel et al.

(10) Patent No.: US 8,763,401 B2
(45) Date of Patent: Jul. 1, 2014

(54) INTEGRATED FUEL NOZZLE AND IGNITION ASSEMBLY FOR GAS TURBINE ENGINES

(75) Inventors: Bhawan B. Patel, Mississauga (CA); Enzo Macchia, Kleinburg (CA); Oleg Morenko, Oakville (CA); George Guglielmin, Toronto (CA)

(73) Assignee: Pratt & Whitney Canada Corp., Longueuil, QC (CA)

( * ) Notice: Subject to any disclaimer, the term of this patent is extended or adjusted under 35 U.S.C. 154(b) by 356 days.

(21) Appl. No.: 13/118,522

(22) Filed: May 30, 2011

(65) Prior Publication Data
US 2012/0304651 A1 Dec. 6, 2012

(51) Int. Cl.
*F02C 1/00* (2006.01)
*F02G 3/00* (2006.01)

(52) U.S. Cl.
USPC ............... 60/740; 60/737; 60/742; 60/39.37; 60/39.821; 60/39.827; 60/776; 60/804

(58) Field of Classification Search
USPC ............. 60/737–748, 39.37, 39.821, 39.827, 60/39.828, 776, 804
See application file for complete search history.

(56) References Cited

U.S. PATENT DOCUMENTS

| | | | |
|---|---|---|---|
| 2,459,286 A | 1/1949 | Rabezzana et al. | |
| 3,548,592 A | 12/1970 | Hopkins | |
| 3,750,392 A | 8/1973 | Zoll | |
| 4,023,351 A | 5/1977 | Beyler et al. | |
| 4,825,658 A | 5/1989 | Beebe | |
| 4,938,019 A * | 7/1990 | Angell et al. | 60/778 |
| 5,163,287 A | 11/1992 | Shekleton et al. | |
| 5,491,972 A | 2/1996 | Bretz et al. | |
| 5,515,681 A | 5/1996 | DeFreitas | |
| 5,588,299 A | 12/1996 | DeFreitas | |
| 5,590,517 A | 1/1997 | DeFreitas | |
| 5,628,180 A * | 5/1997 | DeFreitas | 60/776 |
| 6,698,207 B1 * | 3/2004 | Wiebe et al. | 60/737 |
| 2010/0186368 A1 * | 7/2010 | Ikeda | 60/39.821 |
| 2012/0117976 A1 * | 5/2012 | Krull et al. | 60/776 |

* cited by examiner

*Primary Examiner* — Craig Kim
(74) *Attorney, Agent, or Firm* — Norton Rose Fulbright Canada LLP

(57) ABSTRACT

There is provided an integrated fuel nozzle and ignition assembly for a gas turbine engine comprising a body having a fuel nozzle portion and an igniter portion. The fuel nozzle portion defines a fuel passage extending therethrough between a fuel inlet and a fuel outlet for directing a fuel flow into a combustion chamber. The igniter portion projects laterally from the fuel nozzle portion on a side thereof and comprises an igniter receiving cavity positioned adjacently and laterally on a side of the fuel passage. The assembly further comprises an igniter secured in the igniter receiving cavity for igniting the fuel flow discharged by the fuel passage.

16 Claims, 7 Drawing Sheets

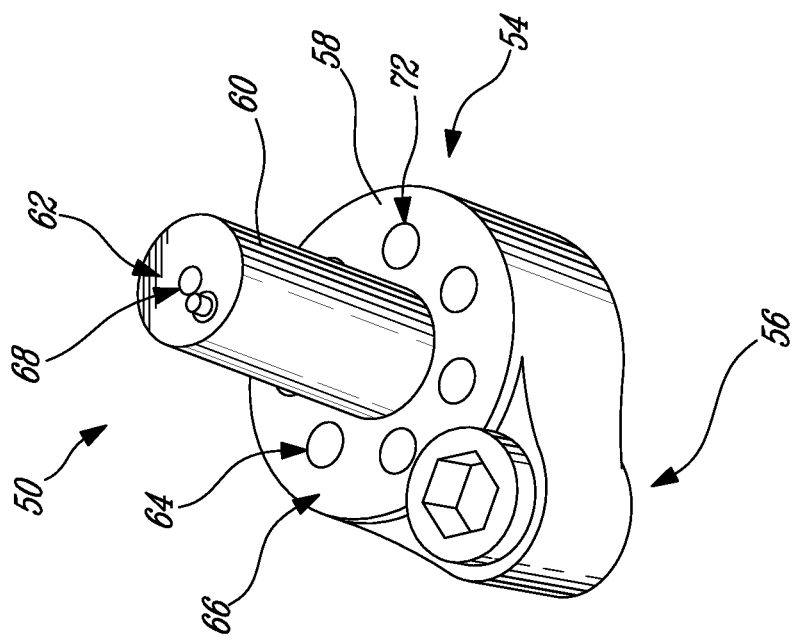
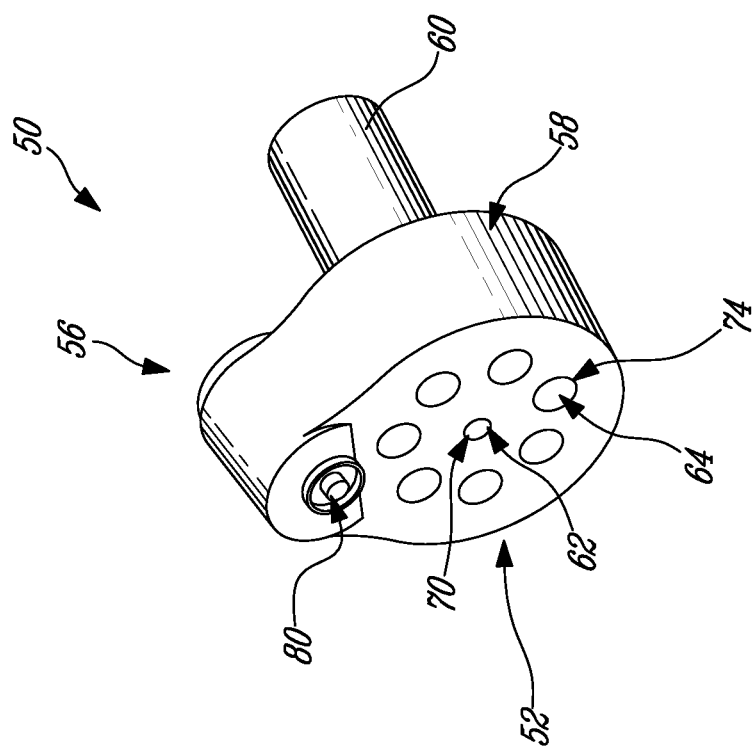

INTEGRATED FUEL NOZZLE AND IGNITION ASSEMBLY FOR GAS TURBINE ENGINES

TECHNICAL FIELD

The application relates generally to the field of gas turbine engines, and more particularly, to an integrated fuel nozzle and ignition structure for gas turbine engines.

BACKGROUND OF THE ART

In gas turbine engines, fuel is discharged and ignited in a combustor defining a combustion chamber. Fuel nozzles connected to a fuel source and extending through the liner wall of the combustor are used for discharging fuel in the combustion chamber. Igniters also extend through the liner wall of the combustor and are used for igniting the fuel discharged in the combustion chamber. Such individual fuel nozzles and igniters contribute to increasing the number of parts and appendages that needs to be mounted to the combustor wall and results in non-negligible blockage or obstruction in the air plenum surrounding the combustor in the gas generator case.

Accordingly, there is a need to provide a new system for discharging and igniting fuel in a gas turbine engine combustor.

SUMMARY

In one aspect, there is provided an integrated fuel nozzle and ignition assembly for a gas turbine engine comprising: a nozzle head having a body having a fuel nozzle portion and an igniter portion, the fuel nozzle portion defining a fuel passage extending therethrough between a fuel inlet and a fuel outlet for directing a fuel flow into a combustion chamber, the igniter portion projecting laterally from the fuel nozzle portion on a side thereof and comprising an igniter receiving cavity positioned adjacently and laterally on a side of the fuel passage; and an igniter mounted in the igniter receiving cavity for igniting the fuel flow discharged by the fuel passage.

In a second aspect, there is provided a method of installing a fuel nozzle and an igniter in a combustor of a gas turbine engine comprising: integrating a fuel nozzle portion and an igniter portion into a single fuel nozzle body, the fuel nozzle portion defining a fuel passage extending between a fuel inlet and a fuel outlet for propagating a fuel flow, the igniter portion projecting laterally from the fuel nozzle portion on a side thereof and comprising an igniter receiving cavity defined in the single fuel nozzle body, the igniter receiving portion being laterally positioned relative to the fuel passage; mounting an igniter in the receiving cavity; and placing the single fuel nozzle body with the igniter mounted thereto in an aperture in a liner wall of the combustor.

In a third aspect, there is provided a fuel nozzle assembly for integration with an igniter comprising: a body having a fuel nozzle portion and an igniter portion, the fuel nozzle portion defining a fuel passage extending therethrough between a fuel inlet and a fuel outlet for directing a fuel flow into a combustion chamber of the combustor, the igniter portion projecting laterally from the fuel nozzle portion on a side thereof and comprising an igniter receiving cavity positioned adjacently and laterally on a side of the fuel passage, the cavity for receiving an igniter for igniting the fuel flow discharged by the fuel passage.

DESCRIPTION OF THE DRAWINGS

Reference is now made to the accompanying figures, in which:

FIG. 2a is a schematic perspective front view of an integrated fuel nozzle and ignition assembly comprising a fuel nozzle portion and an igniter portion for a gas turbine engine, in accordance with an embodiment;

FIG. 2b is a schematic perspective rear view of the assembly of FIG. 2a;

FIG. 3 is a schematic cross-sectional perspective view of the assembly of FIG. 2a;

FIG. 4 is an enlarged schematic cross-sectional front view of the igniter portion of the assembly of FIG. 2a;

DETAILED DESCRIPTION

Figure 1:
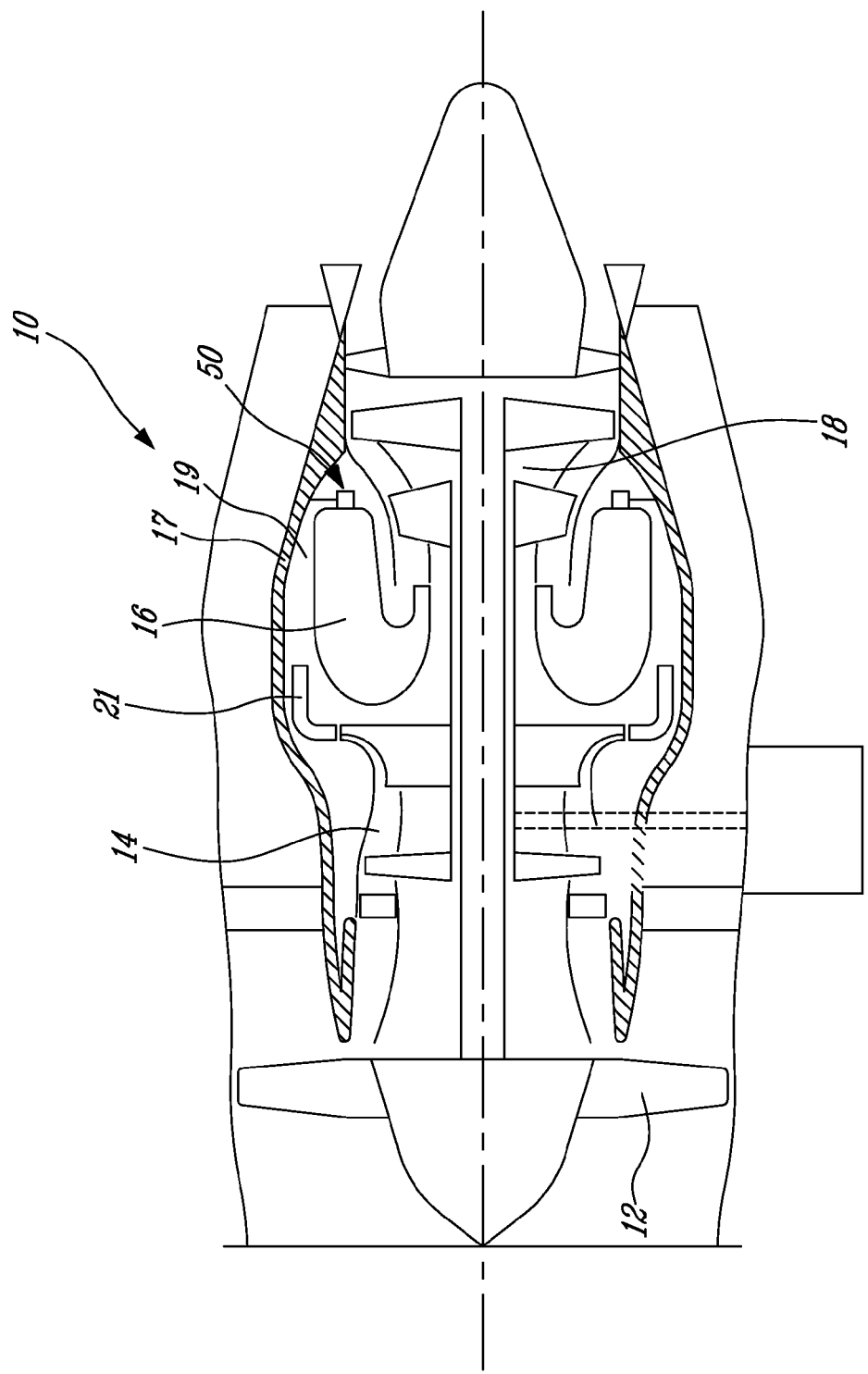
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

The combustor 16 is located inside a gas generator case 17. An outer annulus cavity 19 or air plenum is defined between the generator case 17 and the combustor 16 for receiving air from the compressor 16 via a set of diffuser pipes 21. At least two integrated fuel nozzle and ignition assemblies 50 are mounted to the gas generator case 17 and extend through the annular cavity 19 into the combustor to deliver a mixture or air and fuel therein.

FIGS. 2a and 2b illustrate one embodiment of the integrated fuel nozzle and ignition assembly 50. The assembly 50 is to be mounted to the gas generator case 17 of the gas turbine engine so that the front end 52 of the assembly 50 emerges in the combustion chamber of the combustor 16.

The integrated fuel nozzle and ignition assembly 50 may be seen as having two main portions, i.e. a fuel nozzle portion 54 for discharging fuel in the combustion chamber of the combustor 16 and an igniter portion 56 for igniting the discharged fuel. The fuel nozzle portion 54 comprises a fuel nozzle head 58 and a fuel nozzle stem 60. At least one fuel passage 62 and a plurality of circumferentially spaced-apart air passages 64 extend through the fuel nozzle head 58 from an inlet face 66 (FIG. 2b) of the assembly 50 to a discharge face 52 (FIG. 2a) of the fuel nozzle head 58. The air passages 64 are circularly positioned about the fuel passage 62. The fuel nozzle stem 60 projects from the inlet face 66 of the fuel nozzle head 58 and is shaped and sized so that the fuel passage 62 extends centrally through both the fuel nozzle head 58 and the fuel nozzle stem 60 while the air passages 64 only extend through the fuel nozzle head 58. As a result, the fuel passage 62 extends between a fuel inlet 68 (FIG. 2b) located on the proximal end of the fuel nozzle stem 60 and a fuel outlet 70 located on the discharge face of the fuel nozzle head 58. The fuel inlet 68 is to be connected to a fuel source in order to direct fuel into the fuel passage 62. A fuel tip (not shown) positioned at the fuel outlet 70 of the fuel passage 62 is used for atomizing and spraying the fuel into the combustion chamber of the combustor. Each air passage 64 extends between an air inlet 72 (FIG. 2b) and an air outlet 74 (FIG. 2a) for directing a portion of the air flowing through the annular cavity 19 (FIG. 1) into the combustion chamber of the combustor 16.

In the present embodiment, the fuel nozzle head 58 and the fuel nozzle stem 60 each have a substantially cylindrical shape and are secured together so as to extend along a same axis. The fuel and air passages 62 and 64 also have a substantially cylindrical shape. The fuel passage 62 is substantially at the center of the fuel nozzle head 58 and the air passages 64 are positioned along a circle having a radius R about the center of the fuel passage 62. The external radius of the fuel nozzle stem 60 is greater than the radius of the fuel passage 62 and less than the radius R minus the radius of the air passage 64. For example, the fuel passage 62 may be in the order of 0.009" to 0.020" depending on the flow number of the fuel nozzle. The air passages 64 in the fuel nozzle head 58 are at an angle to help fuel atomization by high swirling air flow.

It should be understood that the shape and size of the fuel nozzle head 58 and the fuel nozzle stem 60 are exemplary only. For example, the fuel nozzle head 58 and the fuel nozzle stem 60 may have different shapes. While it is substantially circular, the cross-section of the fuel nozzle head 58 and the fuel nozzle stem 60 may be square, rectangular, or the like. Similarly, it should be understood that the number and shape of fuel passages 62 and air passages 64 and the positioning of the air passages 64 with respect to the fuel passage 62 are exemplary only. The fuel passage(s) 62 and the air passages 64 are shaped and sized to respectively inject fuel and air in adequate quantity for forming an adequate combustible mixture.

Figure 3:
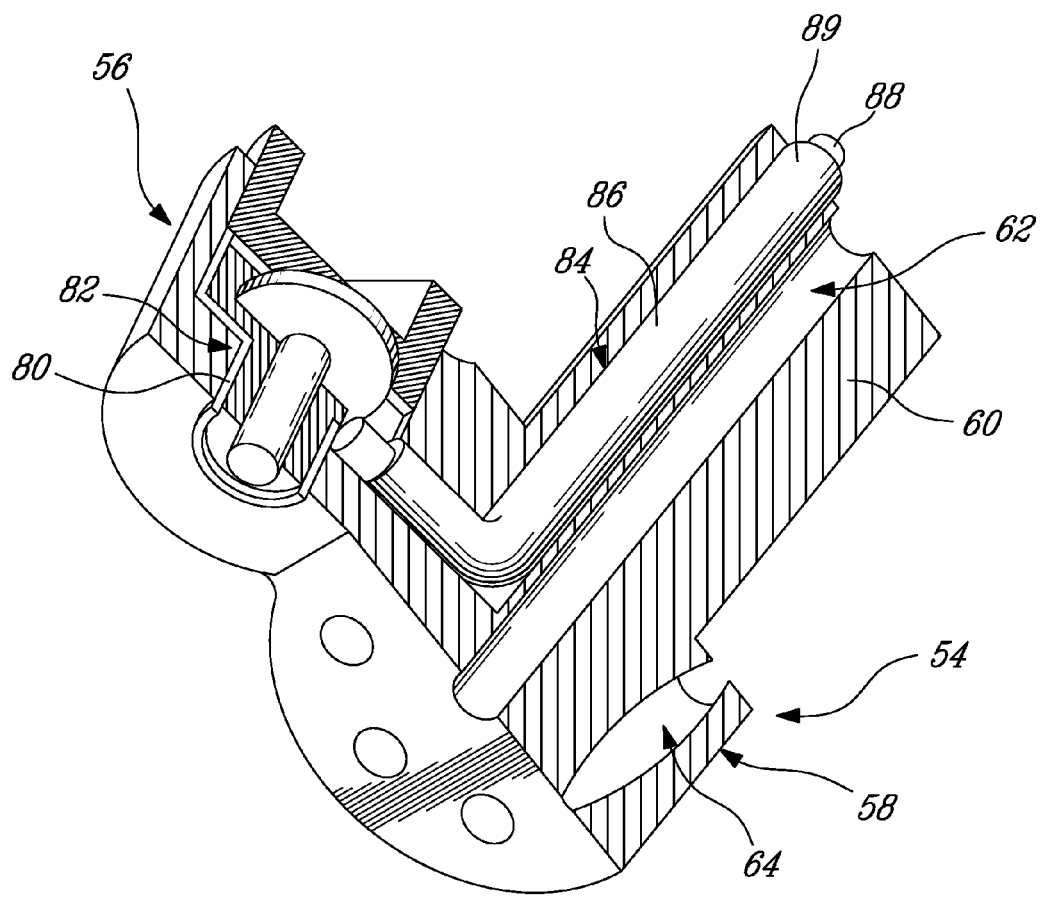

The igniter portion 56 projects laterally from a side of the fuel nozzle portion 54, i.e. from a side of the fuel nozzle head 58. The igniter portion 56 is integrated in a lateral extension of the body of the nozzle head 58. The igniter portion 56 may comprise an igniter plug 80 which emerges from the discharge end 52 of the assembly 50 so as to face the combustion chamber of the combustor 16 in order to ignite the fuel discharged by the fuel passage 62 therein. As illustrated in FIG. 3, the igniter portion 56 comprises a cavity 82 defined in the nozzle head 58. The igniter plug 80 is seated in the cavity 82. The cavity 82 defines an annular shoulder against which the igniter plug 80 may rest. The distal end of the igniter plug 80 projects out from the cavity 82 into the combustion chamber. A lead passage 84 extends laterally from the cavity 82 through the fuel nozzle head 58, and the fuel nozzle stem 60 up to the proximal inlet end of the fuel nozzle stem 60. A lead 86 comprising an electrical conductor 88 embedded into an electrical insulator 89, such as a ceramic insulator for example is inserted into the lead passage 84 for electrically connecting the igniter plug 80 to a triggering unit such as an exciter box for example.

Figure 4:
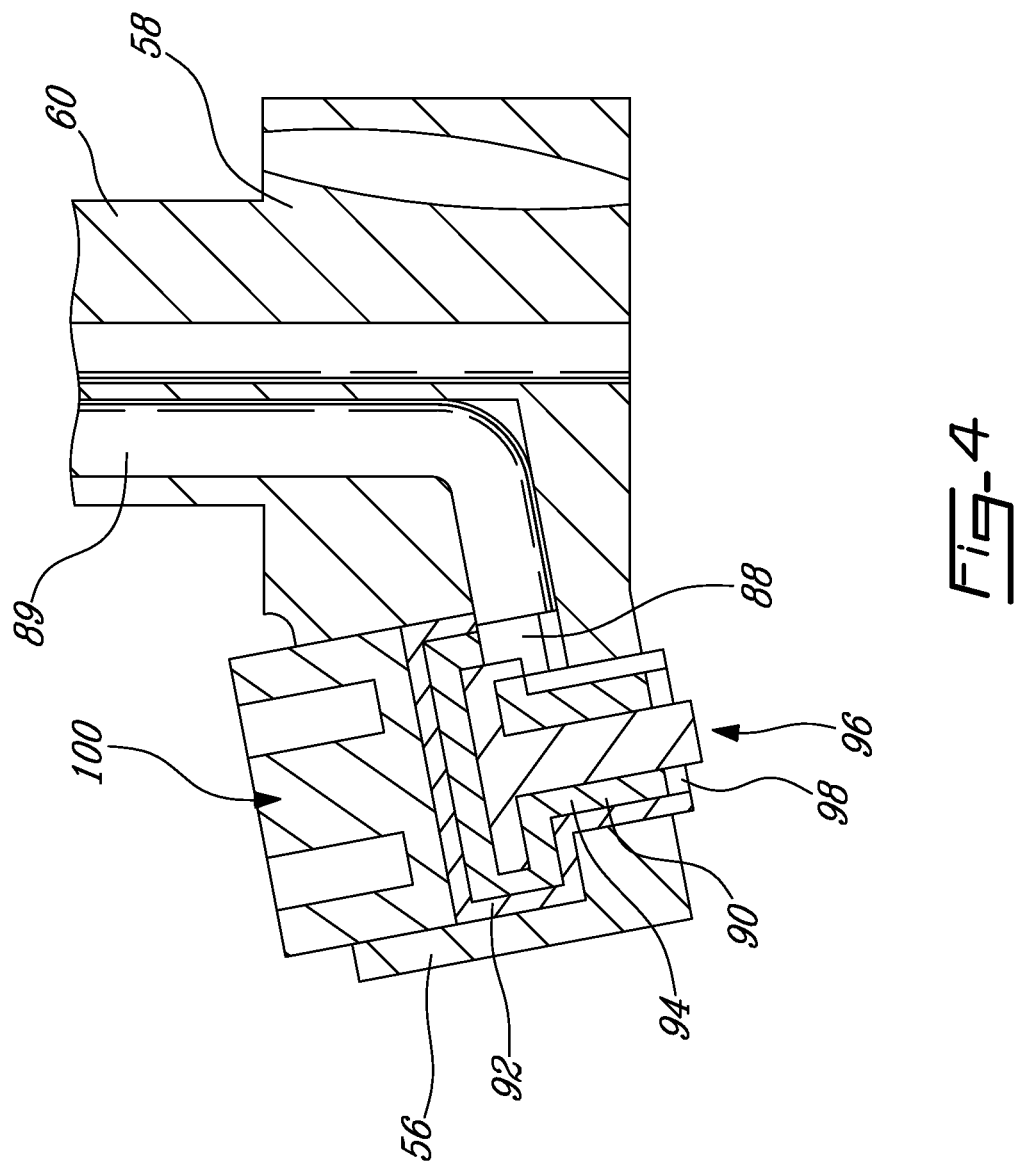

In one embodiment, the igniter plug 80 and the cavity 82 each have a substantially T-shaped cross-section as illustrated in FIG. 4. The shape of the cavity 82 matches that of the igniter plug 80 so that the igniter plug 80 fits into the cavity 82. The igniter plug 80 comprises a central electrode 90 and an outer electrode 92 to be grounded. The two electrodes 90 and 92 are separated by an electrical insulator 94 such as a ceramic insulator for example. At the firing end 96 of the igniter plug 80, the insulator 94 terminates in a semiconductor layer which connects the central electrode 90 and the outer electrode 92. When the igniter plug 80 is inserted in the cavity 82, the central electrode 90 of the igniter plug 80 is electrically connected to the electrical conductor 88 of the lead 86 while the electrical conductor 88 is independent from the outer electrode 92 of the igniter plug 80. Therefore, by applying a voltage to the lead 86, sparks are generated at the firing end 96 of the igniter plug 80.

In one embodiment, the igniter plug 80 is removably inserted in the cavity 82 as illustrated in FIG. 4. In this case, the cavity 82 extends from the inlet face 66 to the discharge face 52 of the body of the nozzle head 58, and a securing device 100 is used to removably secure the igniter plug 80 in the cavity 82. For example, the securing device 100 may be a threaded plug or a snap ring adapted to the shape and size of the cavity 82. Since it is removable and easily accessible from the inlet face of the head 58 when the assembly 50 is mounted to the gas generator case, the igniter plug 80 may be easily replaced in situ in the field and the lifetime of the assembly 50 may be increased.

The following describes a method for mounting the assembly 50 to a combustor of a gas turbine engine. The first step consists in inserting and securing the body of the assembly 50 in aligned apertures in the generator case 17 and the wall of the combustor. It should be understood that the shape of the apertures through the combustor 16 generally matches that of the cross-section of the fuel nozzle head 58 with the integrated side-mounted igniter portion 56. The assembly 50 is installed so that the discharge face 52 of the assembly 50 emerges in the combustion chamber and the inlet face of the head 58 of the assembly 50 is generally outside of the combustor in communication with the outer annulus cavity 19. Since it is laterally positioned on a side of the fuel nozzle head 58, as a result, the igniter portion 56 is accessible from outside of the combustor 16. The igniter plug 80 may be positioned in the cavity 82 prior to mounting the assembly to the generator case 17 and the combustor 16. The igniter plug 80 is positioned so that the outer electrode 92 abuts the wall of the cavity 82 and the central electrode 90 is connected to the electrical conductor 88 of the lead 86. The securing device 100 is positioned in the cavity 82 over the igniter plug 80, thereby enclosing the igniter plug 80 in cavity 82. For example, a threaded plug can be screwed in the cavity 82 of which at least a portion of the wall adjacent to the rear end of the igniter portion is also threaded. In another example, a snap ring is inserted in the cavity 82.

The igniter plug 80 could also be fixedly secured in the cavity 82. In this case, the whole assembly 50 has to be replaced in the event that the igniter plug 80 malfunctions or has reached the end of its lifetime.

Figure 5:
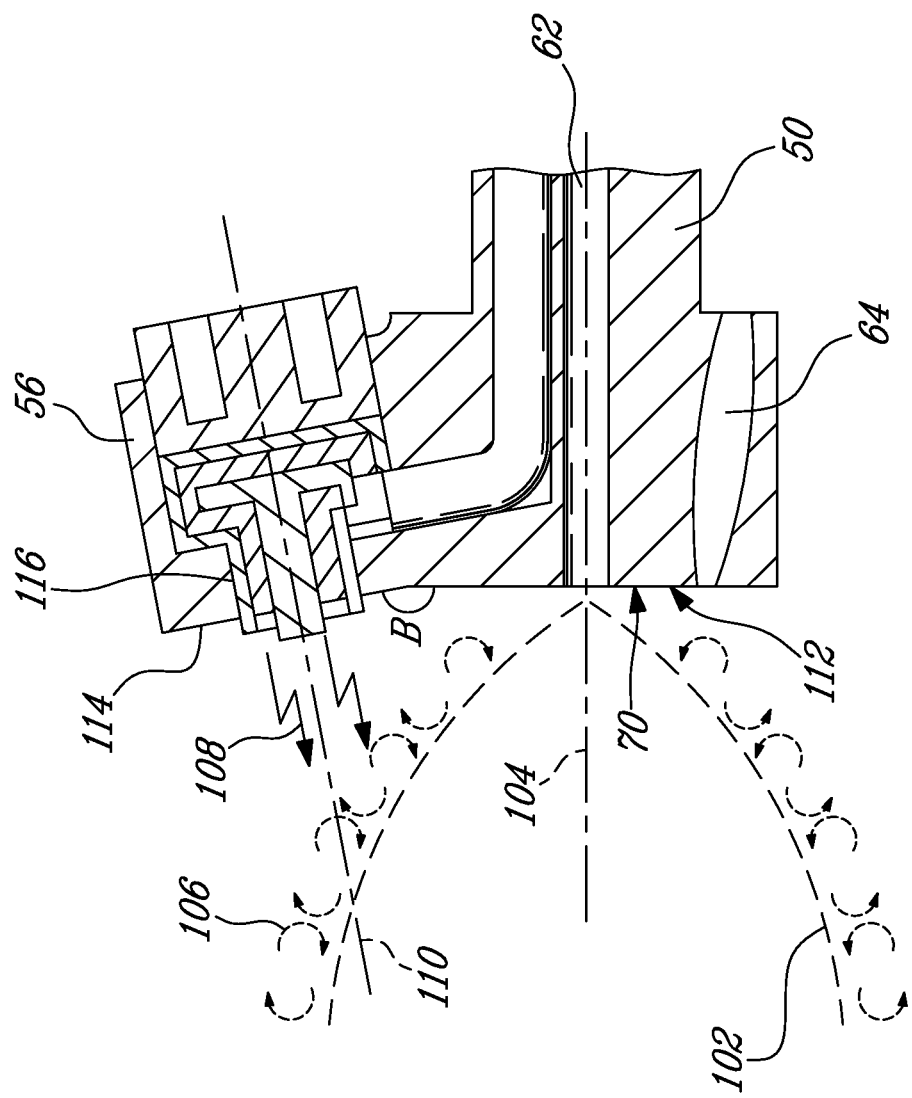
FIG. 5 schematically illustrates the ignition of fuel discharged by the assembly of FIG. 2a, in accordance with an embodiment.

FIG. 5 illustrates the ignition of the fuel discharged by the fuel nozzle portion 54 of the assembly 50. The fuel is discharged through a nozzle tip (not shown) positioned at the outlet 70 of the fuel passage 62 and forms a fuel flow having the shape of a cone 102. The cone of sprayed fuel comprises a central or spray axis 104 which corresponds to the main axis along which fuel is sprayed. The air passages 64 propagate air around the sprayed fuel cone 102 and flow eddies 106 are generated around the cone 102. As a result of the flow eddies 106, air and fuel mix together to form a combustible mixture having a fuel-air ratio adequate for ignition. The actuation of the igniter plug 80 generates sparks 106 along a spark axis 110 which ignites the combustible mixture. Since the cavity 82 and the igniter plug 80 are positioned adjacently on a side of the fuel passage 62, the sparks generated by the igniter plug 82 are directed towards the external surface of the fuel cone 102 where the flow eddies 106 create an adequate combustible mixture. Because of the adjacent position of the igniter plug 80 on a side of the fuel passage 62, the risk of having the igniter electrodes 90 and 92 wetted by the discharged fuel is reduced, which reduces the risk of poor sparking or no sparking.

In one embodiment, the spray axis 104 for the fuel cone 102 and the spark axis 110 for the sparks 108 intersects together at a predetermined angle α so that the sparks 108 generated by the igniter plug 80 are directed towards a desired section of the external surface of the fuel cone 102. The predetermined angle α is obtained by tilting the spark axis 110 with respect to the spray axis 104, i.e. by tilting the central electrode 90 of the igniter plug 80 which extends along the spark axis 110 with respect to the spray axis 104.

In one embodiment, the predetermined angle α is obtained by tilting the igniter portion 56 with respect to the fuel nozzle head 50. As illustrated in FIG. 5, the fuel passage 62 which extends along the spray axis 104 is substantially perpendicular the front or discharging face 112 of the fuel nozzle head 50, and the wall 116 of the cavity 82 is substantially perpendicular to the front or firing face 114 of the igniter portion 56 so that the central electrode 90 of the igniter plug 80 which defines the spark axis 110 be substantially perpendicular to the firing end 114 of the igniter portion 56. The predetermined angle α between the spray axis 104 and the spark axis 110 is obtained by having the discharging face 112 of the fuel nozzle portion 54 extending in a first plane and the firing face 104 of the igniter portion 56 extending in a second plane which intersects the first plane at an angle β which is supplementary to the angle α, i.e. β is equal to 180 degrees minus α. The angle α may range from about 0 to about 20 degrees. The angle β may range from about 165 to about 180 degrees.

In another embodiment, the firing face 114 of the igniter portion 56 and the discharging face 112 of the fuel nozzle portion 54 are coplanar. In this case, the angle α between the spray axis 104 and the spark axis 110 is obtained by having the wall 116 of the cavity 82 intersecting the normal to the firing end 114 at an angle substantially equal to α.

In a further embodiment, the firing face 114 of the igniter portion 56 and the discharging face 112 of the fuel nozzle portion 54 are coplanar, and the spray axis 104 and the spark axis 110 are substantially parallel. In this case, the distance between the fuel passage 62 and the cavity 82 is chosen so that the spark axis 110 intersects the external surface of the fuel spray cone 102.

In one embodiment, a combustor of a gas turbine engine is provided with a plurality of integrated fuel nozzle and ignition assemblies 50. In this case, the igniters 80 of all of the assemblies 50 may be connected to an exciter box and used for igniting the fuel discharged in the combustion chamber. Alternatively, the igniters 80 of only some of the assemblies 50 or only the igniter 80 of a single assembly 50 may be connected to the exciter box and used for igniting the fuel. In the event of malfunctioning of one of these igniters 80, the igniter 80 of at least another assembly 50 may be connected to the exciter box (either electronically or mechanically), thereby reducing the maintenance time for the igniter replacement and increasing the overhaul lifetime for the igniters which can be increased to substantially match the engine overhaul period.

In one embodiment, the assembly 50 is made of a heat conductive material which allows the igniter plug 80 to be cooled down by the air swirling in the air passages 64 adjacent to the cavity 82.

In one embodiment, the igniter portion 56, the fuel nozzle portion 54 of the fuel nozzle head 58, and the fuel nozzle stem 60 are integral to form a single piece. Alternatively, the igniter portion 56, the fuel nozzle portion 54 of the fuel nozzle head 58, and the fuel nozzle stem 60 may be independent pieces which are secured together to form the assembly 50.

While in the present description, the nozzle head is provided with air passages 64 for propagating air in the combustion chamber, the fuel nozzle head 54 of the assembly 50 may comprise no air passages 64. In this case, an additional device is used for injecting air in the combustion chamber.

While the present description refers to an igniter plug 80 adapted to generate sparks, it should be understood that any adequate type of igniters may be used. For example, the igniter may be a plasma jet igniter, a high energy burst igniter, or the like.

Figure 6:
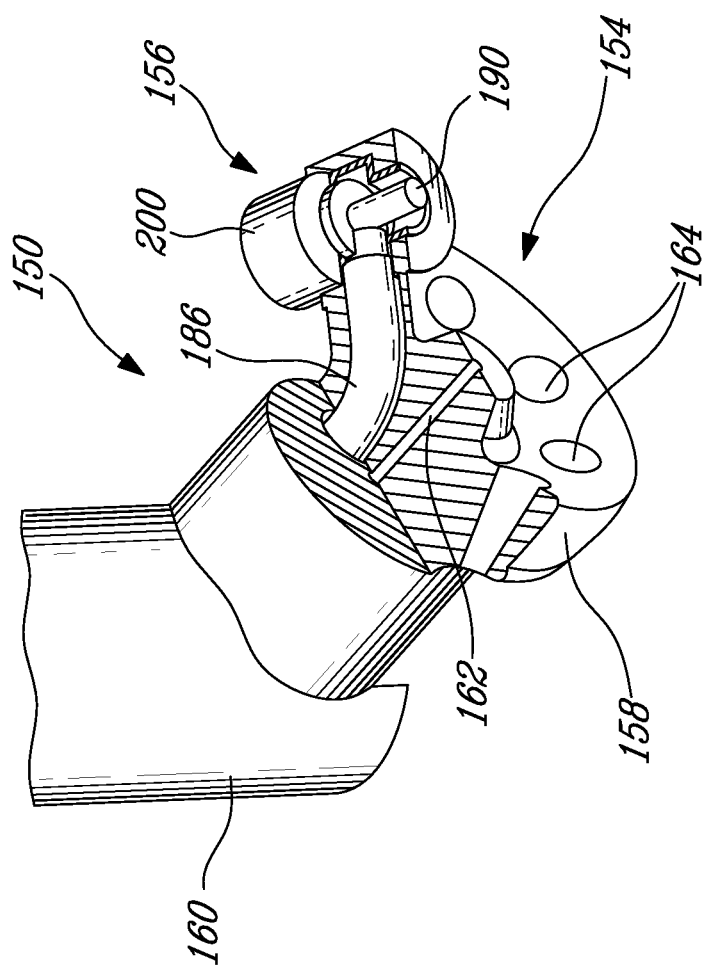
FIG. 6 shows a schematic cross-section of an integrated fuel nozzle and ignition assembly in accordance with another embodiment.
Figure 7:
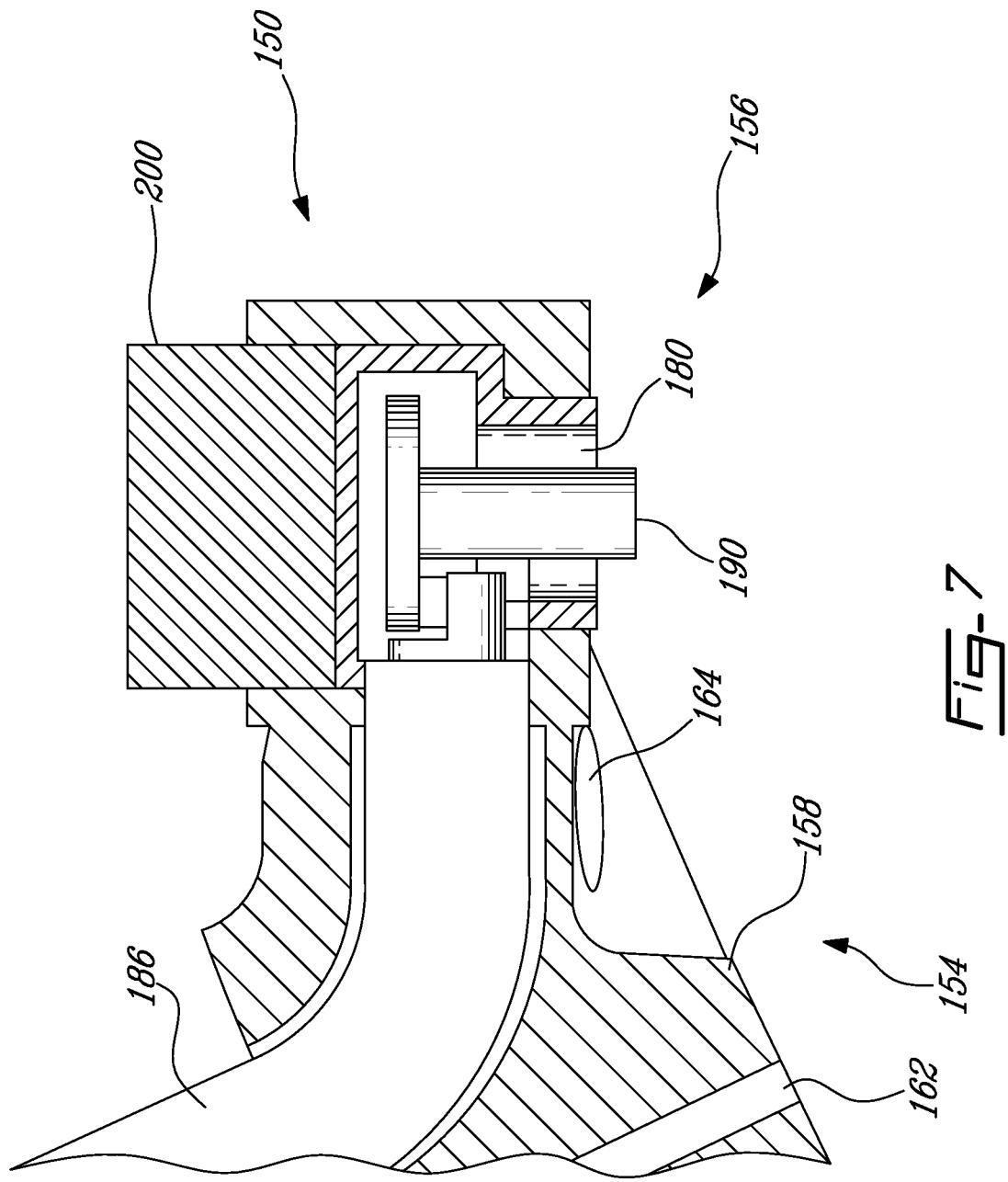
FIG. 7 is an enlarged cross-section of the integrated fuel nozzle and ignition assembly shown in FIG. 6.

FIGS. 6 and 7 show a further model of an integrated fuel nozzle and ignition assembly 150. The corresponding features are referred to by the same reference numerals but in the hundreds. The duplicate description thereof will be omitted for brevity.

The above described integrated igniter/fuel nozzle will reduce additional bosses on the Gas Generator Case due to elimination of separate igniters. In addition to this especially in turbofan engines bypass duct struts to access the igniters are not required. A floating collar with anti-rotation arrangement is required for conventional fuel nozzle tip/Combustor interface due to round tip configuration. In this case the floating collar is not required any anti-rotation arrangement due to the non-round shape of the fuel nozzle head.

The above description is meant to be exemplary only, and one skilled in the art will recognize that changes may be made to the embodiments described without departing from the scope of the invention disclosed. For example, while in an embodiment, it comprises a single igniter, the integrated fuel nozzle and ignition assembly may comprise at least two igniters each projecting laterally from a different side of a central portion comprising a fuel passage. Still other modifications which fall within the scope of the present invention will be apparent to those skilled in the art, in light of a review of this disclosure, and such modifications are intended to fall within the appended claims.

The invention claimed is:

1. An integrated fuel nozzle and ignition assembly for a gas turbine engine comprising:

a nozzle head having a body adapted to extend through a corresponding hole defined in a combustor of the gas turbine engine and comprising a fuel nozzle portion and an igniter portion, the fuel nozzle portion defining a fuel passage extending therethrough between a fuel inlet and a fuel outlet for directing a fuel flow into a combustion chamber of the combustor, wherein fuel is discharged from the fuel outlet as a fuel cone extending along a fuel axis, wherein the fuel axis extends along the fuel inlet an fuel outlet of the fuel nozzle portion and into the combustor, the igniter portion projecting laterally from the fuel nozzle portion on a side thereof and comprising an igniter receiving cavity positioned adjacently and laterally on a side of the fuel passage; and an igniter mounted in the igniter receiving cavity outwardly from the fuel cone for igniting the fuel flow discharged by the fuel passage, wherein the igniter comprises an igniter plug for generating sparks propagating along a spark axis, and wherein the spark axis and the fuel axis intersect together forwardly from the nozzle head at a predetermined angle α for igniting the combustible mixture at an external surface of the fuel cone.

2. The assembly of claim 1, wherein the fuel nozzle portion comprises a fuel nozzle stem projecting from the fuel nozzle portion of the fuel nozzle head, the fuel passage extending through the fuel nozzle head and the fuel nozzle stem and the igniter portion projecting laterally relative to the fuel nozzle stem.

3. The assembly of claim 2, wherein the fuel nozzle portion further comprises an circumferential array of air passages disposed about the fuel passage and extending through the body of the fuel nozzle head for injecting air in the combustion chamber, the igniter receiving cavity being disposed outside of said array of air passages.

4. The assembly of claim 1, wherein the igniter portion is tilted with respect to the fuel nozzle portion of the fuel nozzle head by an angle β supplementary to the angle α.

5. The assembly of claim 1, wherein the body comprises a lead passage extending from the igniter receiving cavity through the igniter portion and the fuel nozzle portion for receiving a lead in order to connect the igniter plug to a triggering unit.

6. The assembly of claim 5, wherein the igniter plug comprises a central electrode, an outer electrode to be grounded, and an insulator therebetween, the central electrode being connected to the lead.

7. The assembly of claim 1, wherein the igniter is removably secured in the igniter receiving cavity.

8. The assembly of claim 7, wherein the igniter receiving cavity extends through the igniter portion to form an aperture therethrough, the assembly further comprising a securing device for securing the igniter in the cavity.

9. The assembly of claim 8, wherein the securing device comprises one of a threaded plug and a snap ring.

10. The assembly of claim 3, wherein the body is made from a heat conductive material so that air flowing in the air passages cool down the igniter.

11. A method of installing a fuel nozzle and an igniter in a combustor of a gas turbine engine comprising:

integrating a fuel nozzle portion and an igniter portion into a single fuel nozzle body, the igniter portion being offset relative to a stem portion extending from the fuel nozzle portion of the fuel nozzle body, the fuel nozzle portion defining a fuel passage extending between a fuel inlet and a fuel outlet for discharging a fuel cone along a fuel axis, wherein the fuel axis extends along the fuel inlet an fuel outlet of the fuel nozzle portion and into the combustor, the igniter portion projecting laterally from the fuel nozzle portion on a side thereof and comprising an igniter receiving cavity defined in the single fuel nozzle body, the igniter receiving portion being laterally positioned relative to the fuel nozzle portion and the fuel cone;

mounting an igniter in the receiving cavity, the igniter being positioned and oriented to deliver a spark on an outer surface of the spray cone, wherein the igniter comprises an igniter plug for generating sparks propagating along a spark axis, and wherein the spark axis and the fuel axis intersect together forwardly from the nozzle head at a predetermined angle α for igniting the combustible mixture at an external surface of the fuel cone; and placing the single fuel nozzle body with the igniter mounted thereto in an aperture in a liner wall of the combustor.

12. The method of claim 11, wherein mounting the igniter comprises connecting a central electrode of the igniter to a lead extending through the body and connectable to a trigger unit.

13. The method of claim 12, further comprising connecting the lead to an exciter box.

14. The method of claim 11, wherein mounting the igniter comprises preventing withdrawal of the igniter from a loading end of the igniter receiving cavity by engaging a securing device in the cavity.

15. The method of claim 14, wherein preventing withdrawal comprises threadably engaging a threaded plug in the igniter receiving cavity.

16. A fuel nozzle assembly for integration with an igniter comprising:

a body to be positioned in an aperture defined in a liner wall of a combustor of the gas turbine engine and comprising a fuel nozzle portion and an igniter portion, the fuel nozzle portion defining a fuel passage extending therethrough between a fuel inlet and a fuel outlet discharging a fuel spray cone along a fuel axis into a combustion chamber of the combustor, wherein the fuel axis extends along the fuel inlet an fuel outlet of the fuel nozzle portion and into the combustor, the igniter portion projecting laterally from the fuel nozzle portion on a side thereof and comprising an igniter receiving cavity positioned adjacently and laterally on a side of the fuel nozzle portion an igniter mounted in the cavity and oriented so that a spark axis thereof intersects the fuel axis, in use the igniter being positioned to direct a spark from outside of the fuel spray cone against an outer surface of the fuel spray cone.

* * * * *